(12) United States Patent
Toda et al.

(10) Patent No.: US 11,276,312 B2
(45) Date of Patent: Mar. 15, 2022

(54) VEHICLE CONTROL APPARATUS, VEHICLE CONTROL METHOD, AND PROGRAM

(71) Applicant: HONDA MOTOR CO., LTD., Tokyo (JP)

(72) Inventors: Akihiro Toda, Wako (JP); Yuki Motegi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 16/645,809

(22) PCT Filed: Sep. 20, 2017

(86) PCT No.: PCT/JP2017/033874
§ 371 (c)(1),
(2) Date: Mar. 10, 2020

(87) PCT Pub. No.: WO2019/058446
PCT Pub. Date: Mar. 28, 2019

(65) Prior Publication Data
US 2020/0279487 A1    Sep. 3, 2020

(51) Int. Cl.
*G08G 1/16*        (2006.01)
*B60W 30/095*    (2012.01)
(Continued)

(52) U.S. Cl.
CPC ............ *G08G 1/166* (2013.01); *B60W 30/09* (2013.01); *B60W 30/0956* (2013.01);
(Continued)

(58) Field of Classification Search
CPC ... G08G 1/166; G08G 1/167; B60W 60/0015; B60W 60/0027; B60W 30/09;
(Continued)

(56) References Cited

U.S. PATENT DOCUMENTS

| 2010/0201509 A1* | 8/2010 | Hara ...................... G08G 1/166 |
| | | 340/435 |
| 2015/0298693 A1* | 10/2015 | Uechi ...................... B60T 7/22 |
| | | 701/70 |

(Continued)

FOREIGN PATENT DOCUMENTS

| CN | 101512617 | 8/2009 |
| CN | 104781867 | 7/2015 |

(Continued)

OTHER PUBLICATIONS

International Search Report and Written Opinion for International Application No. PCT/JP2017/033874 dated Nov. 7, 2017, 7 pages.

(Continued)

*Primary Examiner* — Peter D Nolan
*Assistant Examiner* — Ashley L Redhead, Jr.
(74) *Attorney, Agent, or Firm* — Amin, Turocy & Watson, LLP

(57) ABSTRACT

A vehicle control apparatus, a vehicle control method, and a program that can curb unnecessary driving control are provided. The vehicle control apparatus includes a pedestrian recognition unit configured to recognize a crossing pedestrian crossing a road on which a vehicle travels, a space recognition unit configured to recognize whether there is a space having a predetermined width or more between a lane on which the vehicle travels and an oncoming lane, and a driving control unit configured to execute avoidance support for avoiding contact between the vehicle and the crossing pedestrian recognized by the pedestrian recognition unit based on a behavior of the crossing pedestrian and a behavior of the vehicle, in which the driving control unit is configured to determine whether the crossing pedestrian recognized by the pedestrian recognition unit is moving from the oncoming lane side to a space recognized by the space recognition unit, and curb the avoidance support upon (Continued)

determination that the crossing pedestrian is moving to the space.

7 Claims, 7 Drawing Sheets

(51) Int. Cl.
*B60W 60/00* (2020.01)
*B60W 30/09* (2012.01)

(52) U.S. Cl.
CPC .... *B60W 60/0015* (2020.02); *B60W 60/0027* (2020.02); *G08G 1/167* (2013.01); *B60W 2552/45* (2020.02); *B60W 2554/406* (2020.02); *B60W 2554/4029* (2020.02); *B60W 2554/4042* (2020.02)

(58) Field of Classification Search
CPC ..... B60W 30/0956; B60W 2554/4029; B60W 2554/4042; B60W 2554/406; B60W 2552/45; B60W 2552/10; B60W 2552/53
See application file for complete search history.

(56) References Cited

U.S. PATENT DOCUMENTS

| | | | |
|---|---|---|---|
| 2016/0012301 A1 | 1/2016 | Arndt et al. | |
| 2017/0327110 A1* | 11/2017 | Inoue | B60W 30/095 |
| 2018/0032078 A1* | 2/2018 | Ferguson | G05D 1/0214 |

FOREIGN PATENT DOCUMENTS

| | | |
|---|---|---|
| CN | 106428000 | 2/2017 |
| CN | 106530823 | 3/2017 |
| CN | 107082062 | 8/2017 |
| DE | 102015015021 | 5/2016 |
| JP | 2005-316607 | 11/2005 |
| JP | 2008-282097 | 11/2008 |
| JP | 2010-181928 | 8/2010 |
| WO | 2014/068671 | 5/2014 |
| WO | 2017/126012 | 7/2017 |

OTHER PUBLICATIONS

Chinese Office Action for Chinese Patent Application No. 201780094833.0 dated Jul. 27, 2021.
Chinese Notice of Allowance for Chinese Patent Application No. 201780094833.0 dated Jan. 14, 2022.

* cited by examiner

VEHICLE CONTROL APPARATUS, VEHICLE CONTROL METHOD, AND PROGRAM

TECHNICAL FIELD

The present invention relates to a vehicle control apparatus, a vehicle control method, and a program.

BACKGROUND

In recent years, research on automatic control of vehicles has been conducted. In relation to this, a technology in which a vehicle detects a pedestrian on a road provided with a barrier such as a protective fence and performs control to prevent a collision with the pedestrian on the basis of a positional relationship between the barrier and the pedestrian has been known (refer to Patent Document 1).

RELATED ART DOCUMENTS

Patent Documents

[Patent Document 1]
Japanese Unexamined Patent Application, First Publication No. 2008-282097

SUMMARY OF INVENTION

Problems to be Solved by the Invention

However, the conventional technology is based on an assumption that a pedestrian does not go beyond an area provided with a barrier, and does not control a host vehicle when a pedestrian is detected in a dividing strip or the like on a road on which pedestrians can walk. For this reason, when a pedestrian is detected in the dividing strip or the like on the road on which pedestrians can walk, unnecessary driving control has been performed in some cases.

The present invention has been made in view of such circumstances, and an object thereof is to provide a vehicle control apparatus, a vehicle control method, and a program that can curb unnecessary driving control.

Means for Solving the Problem (1): A vehicle control apparatus includes a pedestrian recognition unit (131) configured to recognize a crossing pedestrian crossing a road on which a vehicle (a host vehicle M) travels, a space recognition unit (132) configured to recognize whether there is a space having a predetermined width or more between a lane on which the vehicle travels and an oncoming lane, and a driving control unit (140, 160) configured to execute avoidance support for avoiding contact between the vehicle and the crossing pedestrian recognized by the pedestrian recognition unit based on a behavior of the crossing pedestrian and a behavior of the vehicle, in which the driving control unit is configured to determine whether the crossing pedestrian recognized by the pedestrian recognition unit is moving from the oncoming lane side to a space recognized by the space recognition unit, and curb the avoidance support upon determination that the crossing pedestrian is moving to the space.

(2): In the vehicle control apparatus described in (1), the driving control unit is configured to determine whether or not a traveling lane on which the vehicle travels is suitable for crossing, and curb the avoidance support upon determination that the traveling lane is not suitable for crossing.

(3): In the vehicle control apparatus described in (1), the driving control unit is configured to determine whether a number of other vehicles traveling on an oncoming lane with respect to a lane on which the vehicle travels is less than a predetermined number, and curb the avoidance support upon determination that the number of other vehicles is less than the predetermined number.

(4): In the vehicle control apparatus described in (1), the driving control unit is configured to determine whether a traffic volume of the oncoming lane of the lane on which the vehicle travels is less than a reference, and curb the avoidance support upon determination that the traffic volume is less than the reference.

(5): In the vehicle control apparatus described in (1), even if a future position predicted based on a speed of the crossing pedestrian in a road width direction interferes with a trajectory of the vehicle, the driving control unit is configured to determine whether the crossing pedestrian is moving to a space recognized by the space recognition unit, and curb the avoidance support upon determination that the crossing pedestrian is moving to the space.

(6): In the vehicle control apparatus described in (1), the space recognition unit is configured to recognize a space having the predetermined width or more in which a structure that obstructs entry of the vehicle and does not obstruct walking of the crossing pedestrian is present.

(7): A vehicle control method includes recognizing, by a pedestrian recognition unit, a crossing pedestrian crossing a road on which a vehicle travels, recognizing, by a space recognition unit, whether there is a space having a predetermined width or more between a lane on which the vehicle travels and an oncoming lane, executing, by a driving control unit, avoidance support for avoiding contact between the vehicle and the crossing pedestrian recognized by the pedestrian recognition unit based on a behavior of the crossing pedestrian and a behavior of the vehicle, determining whether the crossing pedestrian recognized by the pedestrian recognition unit is moving from the oncoming lane side to a space recognized by the space recognition unit, and curbing the avoidance support upon determination that the crossing pedestrian is moving to the space.

(8): A program is configured to cause a computer, mounted on a vehicle including a pedestrian recognition unit for recognizing a crossing pedestrian crossing a road on which the vehicle travels, to recognize whether there is a space having a predetermined width or more between a lane on which the vehicle travels and an oncoming lane, avoid contact between the vehicle and the recognized crossing pedestrian based on a behavior of the crossing pedestrian and a behavior of the vehicle, determine whether the recognized crossing pedestrian is moving from the oncoming lane side to the recognized space, and curb the avoidance upon determination that the crossing pedestrian is moving to the space.

Advantage of the Invention

According to (1), (7), and (8), it is possible to curb unnecessary driving control.

According to (2), (3), and (4), if it is determined that road conditions are not suitable for a crossing, even though there is a recognized pedestrian, it is possible to curb unnecessary driving control.

According to (5) and (6), when a pedestrian is moving to a recognized space, it is assumed that the pedestrian stops in the space, and thus it is possible to curb unnecessary driving control.

DESCRIPTION OF EMBODIMENTS

Hereinafter, an embodiment of a vehicle control apparatus, a vehicle control method, and a program of the present invention will be described.

[Overall Configuration]

Figure 1:
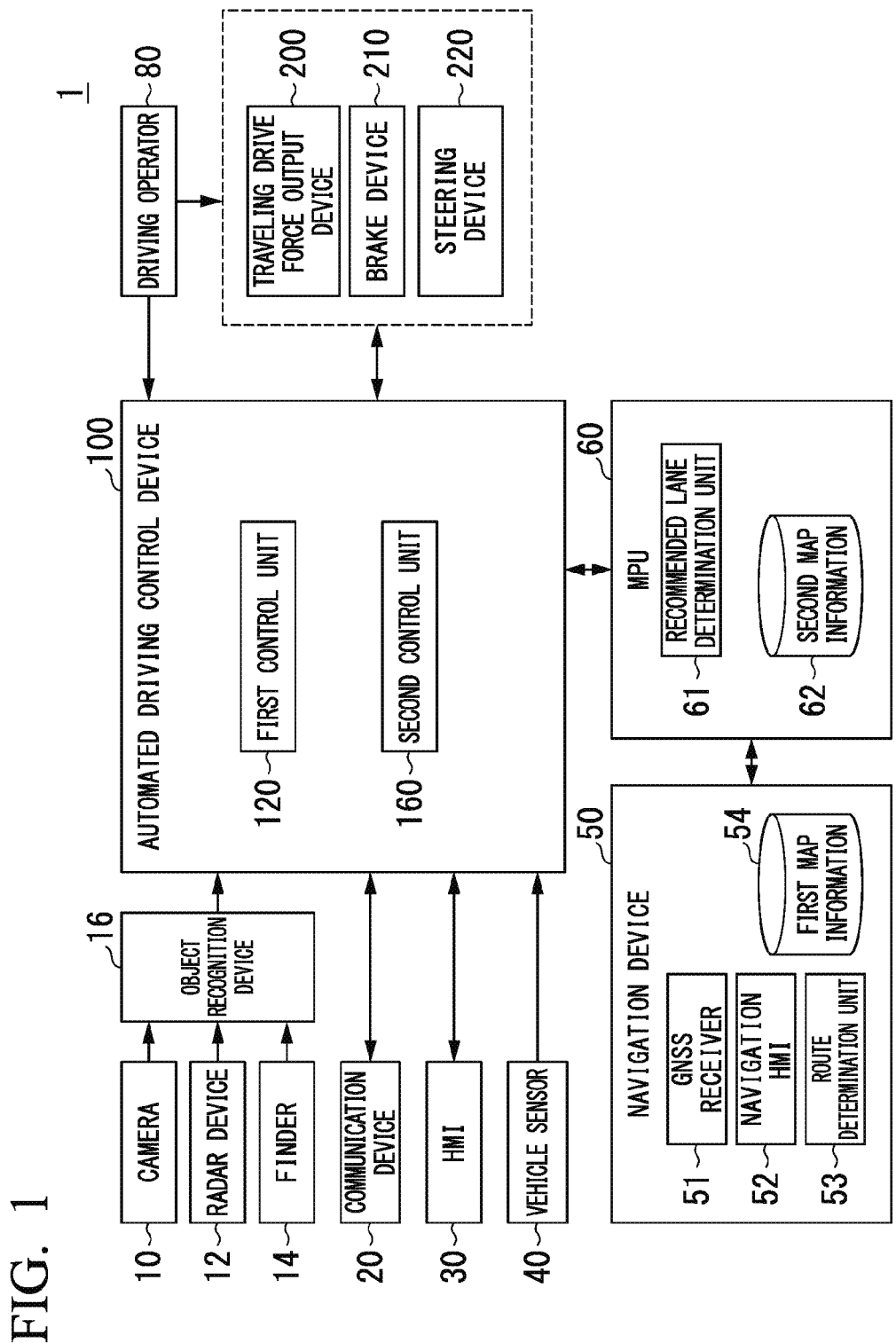
FIG. 1 is a configuration diagram of a vehicle system 1 using a vehicle control apparatus according to an embodiment.

FIG. 1 is a configuration diagram of a vehicle system 1 using a vehicle control apparatus according to an embodiment. A vehicle on which the vehicle system 1 is mounted is, for example, two-wheel, three-wheel, or four-wheel vehicle, and a driving source thereof is an internal combustion engine such as a diesel engine or a gasoline engine, an electric motor, or a combination thereof. When an electric motor is included, the electric motor operates using electric power generated by a generation unit connected to the internal combustion engine, or electric power discharged from a secondary battery or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100 (an example of a vehicle control apparatus), a traveling drive force output device 200, a brake device 210, and a steering device 220. These devices or apparatuses are connected to each other by a multiplex communication line such as a control unit area network (CAN) communicator line, a serial communication line, a wireless communication network, or the like. Note that the configuration shown in FIG. 1 is merely an example, and a part of the configuration may be omitted or another configuration may be added.

The camera 10 is, for example, a digital camera using a solid-state imaging device such as a charge coupled device (CCD) or a complementary metal oxide semiconductor (CMOS). One or a plurality of cameras 10 are attached to arbitrary places of a vehicle (hereinafter, referred to as a host vehicle M) on which the vehicle system 1 is mounted. When the front is imaged, the camera 10 is attached to an upper part of the front windshield, a back of the rearview mirror, or the like. The camera 10 periodically repeats imaging a vicinity of the host vehicle M. The camera 10 may also be a stereo camera.

The radar device 12 radiates radio waves such as millimeter waves to the vicinity of the host vehicle M, and detects at least a position (a distance and an orientation) of an object by detecting radio waves (reflected waves) reflected by the object. One or a plurality of radar devices 12 are attached to arbitrary places of the host vehicle M. The radar device 12 may detect the position and a speed of the object using a frequency modulated continuous wave (FM-CW) method.

The finder 14 is a light detection and range (LIDAR) device. The finder 14 radiates light to the vicinity of the host vehicle M and measures scattered light. The finder 14 detects a distance to an object on the basis of time from light emission and light reception. The radiated light is, for example, pulsed laser light. One or a plurality of finders 14 are attached to arbitrary places of the host vehicle M.

The object recognition device 16 performs sensor fusion processing on a result of detection performed by some or all of the camera 10, the radar device 12, and the finder 14, and recognizes the position, type, speed, and the like of the object. The object recognition device 16 outputs a result of the recognition to the automated driving control device 100. In addition, the object recognition device 16 may output, when necessary, the results of detection by the camera 10, the radar device 12, and the finder 14 to the automated driving control device 100 as they are.

The communication device 20 uses, for example, a cellular network, a Wi-Fi network, a Bluetooth (a registered trademark), a dedicated short range communication (DSRC), or the like, and communicates with another vehicle present in the vicinity of the host vehicle M or communicates with various types of server devices via a radio base station.

The HMI 30 presents various types of information to an occupant of the host vehicle M and receives an input operation from the occupant. The HMI 30 includes various display devices, speakers, buzzers, touch panels, switches, keys, and the like.

The vehicle sensor 40 includes a vehicle speed sensor that detects the speed of the host vehicle M, an acceleration sensor that detects the acceleration, a yaw rate sensor that detects an angular speed around a vertical axis, an orientation sensor that detects a direction of the host vehicle M, and the like.

The navigation device 50 includes, for example, a global navigation satellite system (GNSS) receiver 51, a navigation HMI 52, and a route determination unit 53, and holds first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or supplemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determination unit 53 determines, for example, a route (hereinafter, a route on a map) from the position (or an arbitrary input position) of the host vehicle M identified by the GNSS receiver 51 to a destination input from the occupant using the navigation HMI 52 with reference to the first map information 54. The first map information 54 is, for example, information in which a road shape is expressed by a link indicating a road and nodes connected by links. The first map information 54 may include curvature of a road, point of interest (POI) information, and the like. A route on a map determined by the route determination unit 53 is output to the MPU 60. In addition, the navigation device 50 may perform route guidance using the navigation HMI 52 on the basis of the route on a map determined by the route determination unit 53. Note that the navigation device 50 may be realized by, for example, a function of a terminal device such as a smart phone or a tablet terminal owned by the occupant. Moreover, the navigation device 50 may transmit a current position and a destination to a navigation server via the communication device 20 and acquire a route on a map returned from the navigation server.

The MPU 60 functions as, for example, a recommended lane determination unit 61, and holds second map information 62 in the storage device such as an HDD or a flash memory. The recommended lane determination unit 61 divides the route provided from the navigation device 50 into a plurality of blocks (for example, divides every 100 [m] in a vehicle traveling direction), and determines a recommended lane for each block with reference to the second map information 62. The recommended lane determination unit 61 determines on which numbered lane from the left to travel. When there is a branch place, a merging place, or the like in the route, the recommended lane determination unit 61 determines a recommended lane such that the host vehicle M may travel in a reasonable route for traveling to a branch destination.

The second map information 62 is map information with higher accuracy than that of the first map information 54. The second map information 62 includes, for example, information on a center of a lane or information on a boundary of the lane. In addition, the second map information 62 may include road information, traffic regulation information, address information (addresses/postal codes), facility information, telephone number information, and the like. The second map information 62 may be updated at any time by accessing another device using the communication device 20 communicating with another device.

The driving operator 80 includes, for example, an accelerator pedal, a brake pedal, a shift lever, a steering wheel, a modified steer, a joystick, and other operators. A sensor that detects an operation amount or a presence or absence of an operation is attached to the driving operator 80, and this detection result is output to the automated driving control device 100 or the traveling drive force output device 200, and one or both of the brake device 210 and the steering device 220.

The automated driving control device 100 includes, for example, a first control unit 120 and a second control unit 160. The first control unit 120 and the second control unit 160 are realized, for example, by a hardware processor such as a central processing unit (CPU) executing a program (software). In addition, some or all of these components may be realized by hardware (a circuit; including circuitry) such as a large scale integration (LSI), an application specific integrated circuit (ASIC), a field-programmable gate array (FPGA), and a graphics processing unit (GPU), and may also be realized by a cooperation of software and hardware.

Figure 2:
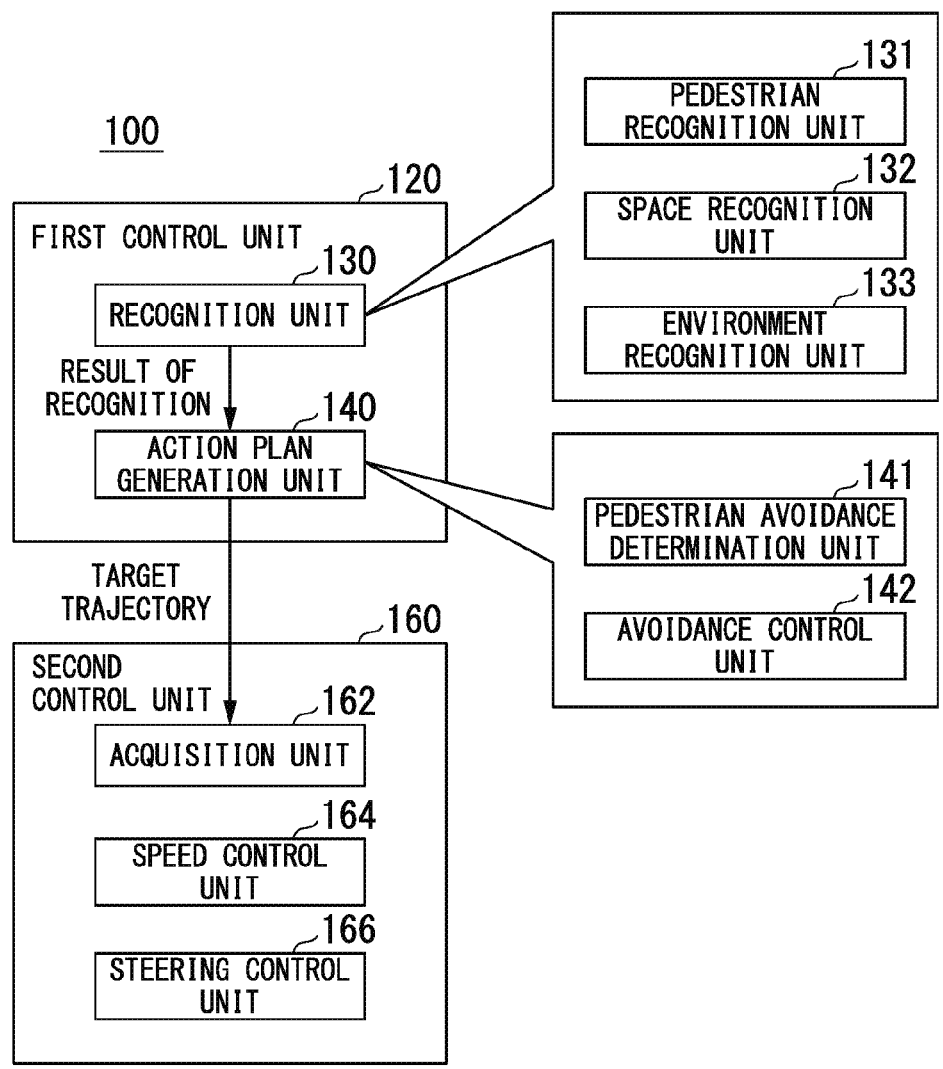
FIG. 2 is a functional configuration diagram of a first control unit 120 and a second control unit 160.

FIG. 2 is a functional configuration diagram of the first control unit 120 and the second control unit 160. The first control unit 120 includes, for example, a recognition unit 130 and an action plan generation unit 140. A combination of the action plan generation unit 140 and the second control unit 160 is an example of a "driving control unit."

The first control unit 120 realizes, for example, a function based on artificial intelligence (AI) and a function based on a model given in advance in parallel. For example, a function of "recognizing an intersection" is realized by executing a recognition of an intersection by deep learning or the like and a recognition based on conditions (including pattern matching signals, road markings, and the like) given in advance in parallel and comprehensively evaluating both by scoring them. As a result, the reliability of automated driving is guaranteed.

The recognition unit 130 recognizes situations such as the position, speed and acceleration of an object in the vicinity of the host vehicle M on the basis of information to be input from the camera 10, the radar device 12, and the finder 14 via the object recognition device 16. The object includes other vehicles, pedestrians, and the like. The position of the object is, for example, recognized as a position on absolute coordinates having the origin at a representative point (a center of gravity, a center of a drive axis, or the like) of the host vehicle M, and is used for control. The position of the object may be represented by a representative point such as a center of gravity or a corner of the object, or may be represented by a represented area. A "state" of the object may include the acceleration or jerk of the object, or an "action state" (for example, whether a lane is being changed or is intended to be changed). In addition, the recognition unit 130 recognizes a shape of a curve through which the host vehicle M will pass from now on the basis of an image captured by the camera 10. The recognition unit 130 converts the shape of the curve from the image captured by the camera 10 into a real plane, and outputs, for example, two-dimensional point sequence information or information expressed using a model equivalent thereto to the action plan generation unit 140 as information indicating the shape of the curve.

In addition, the recognition unit 130 recognizes, for example, a lane (traveling lane) in which the host vehicle M is traveling. For example, the recognition unit 130 recognizes a traveling lane by comparing a pattern (for example, an array of solid lines and dashed lines) of a road section line obtained from the second map information 62 with a pattern of a road section line in the vicinity of the host vehicle M recognized from an image captured by the camera 10. Note that the recognition unit 130 may recognize a traveling lane by recognizing not only a road section line but also a traveling road boundary (road boundary) including road section lines, road shoulders, curbs, median strips, guardrails, and the like. In this recognition, the position of the host vehicle M acquired from the navigation device 50 and a result of processing performed by the INS may be added. Moreover, the recognition unit 130 recognizes temporary stop lines, obstacles, signals, tollgates, structures on a median strip, or other road events.

When a traveling lane is recognized, the recognition unit 130 recognizes the position and posture of the host vehicle M with respect to the traveling lane. The recognition unit 130 may recognize, for example, a deviation of a reference point of the host vehicle M from a lane center and an angle formed with respect to a line connecting the lane centers in a traveling direction of the host vehicle M as the relative position and posture of the host vehicle M with respect to the traveling lane. In addition, instead, the recognition unit 130 may recognize a position and the like of the reference point of the host vehicle M with respect to either side end (a road section line or a road boundary) of the traveling lane as the relative position of the host vehicle M with respect to the traveling lane.

In addition, the recognition unit 130 may derive recognition accuracy and output it to the action plan generation unit 140 as recognition accuracy information in the recognition processing described above. For example, the recognition unit 130 generates the recognition accuracy information on the basis of a frequency at which a road section line can be recognized in a certain period. In addition, functions of the pedestrian recognition unit 131 and the space recognition unit 132 of the recognition unit 130 will be described below.

In principle, the action plan generation unit 140 travels on a recommended lane determined by the recommended lane determination unit 61, and furthermore, causes the host vehicle M to travel according to events sequentially executed in automated driving to cope with a vicinity situation of the host vehicle M.

The second control unit 160 includes, for example, an acquisition unit 162, a speed control unit 164, and a steering control unit 166. The acquisition unit 162 acquires information on the target trajectory (trajectory points) generated by the action plan generation unit 140 and stores it in a memory (not shown). The speed control unit 164 controls the traveling drive force output device 200 or the brake device 210 on the basis of a speed element associated with the target trajectory stored in the memory. The steering control unit 166 controls the steering device 220 in accordance with a bending of the target trajectory stored in the memory. Processing of the speed control unit 164 and the steering control unit 166 is realized by, for example, a combination of feed forward control and feedback control. As an example, the steering control unit 166 executes a combination of the feed forward control in accordance with curvature of a road in front of the host vehicle M and the feedback control based on a deviation from the target trajectory.

The traveling drive force output device 200 outputs a traveling drive force (torque) for a traveling of a vehicle to drive wheels. The traveling drive force output device 200 includes, for example, a combination of an internal combustion engine, an electric motor, a transmission, and the like, and an ECU that controls these. The ECU controls the constituents described above according to information input from the second control unit 160 or information input from the driving operator 80.

The brake device 210 includes, for example, a brake caliper, a cylinder that transmits a hydraulic pressure to the brake caliper, an electric motor that generates a hydraulic pressure to the cylinder, and a brake ECU. The brake ECU controls the electric motor according to the information input from the second control unit 160 or the information input from the driving operator 80 such that a brake torque corresponding to a braking operation is output to each wheel. The brake device 210 may include, as a backup, a mechanism that transmits the hydraulic pressure generated by an operation of the brake pedal included in the driving operator 80 to the cylinder via a master cylinder. Note that the brake device 210 is not limited to the configuration described above, and may be an electronically controlled hydraulic brake device that controls an actuator according to the information input from the second control unit 160 and transmits the hydraulic pressure of the master cylinder to the cylinder.

The steering device 220 includes, for example, a steering ECU and an electric motor. The electric motor changes a direction of the steering wheel by, for example, applying a force to a rack and pinion mechanism. The steering ECU drives the electric motor and changes the direction of the steering wheel according to the information input from the second control unit 160 or the information input from the driving operator 80.

[For Determination on Crossing of Pedestrian]

Next, content of processing recognized by the recognition unit 130 will be described.

The recognition unit 130 includes, for example, the pedestrian recognition unit 131, the space recognition unit 132, and an environment recognition unit 133. The action plan generation unit 140 includes, for example, a pedestrian avoidance determination unit 141 and an avoidance control unit 142.

Figure 3:
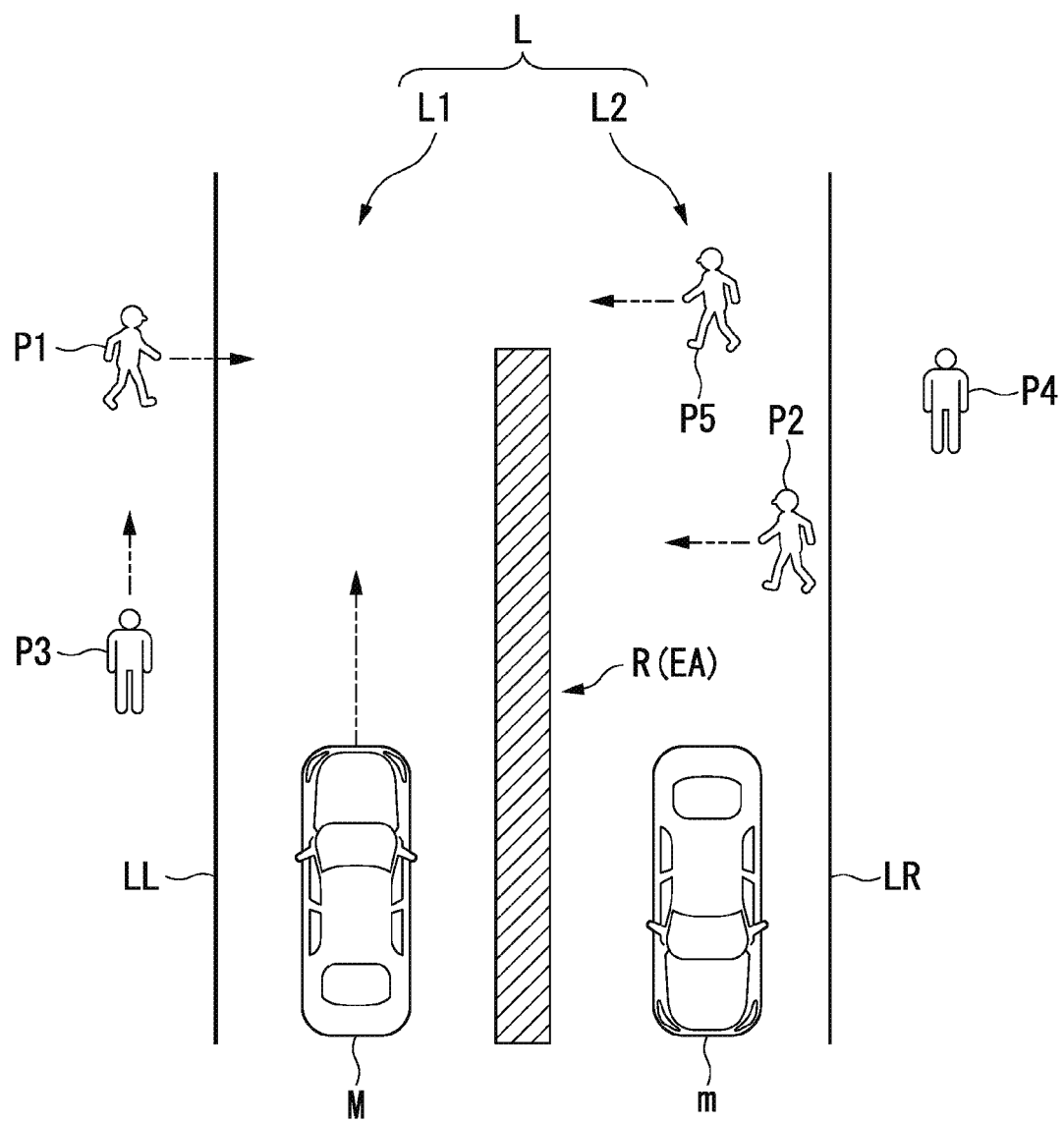
FIG. 3 is a diagram which shows an example of a state around a host vehicle M.

FIG. 3 is a diagram which shows an example of a state around the host vehicle M. The host vehicle M travels on a traveling lane L1 side of a road L in which a dividing strip R is provided between the traveling lane L and an oncoming lane L2. The dividing strip R is provided, for example, to separate the traveling lane L1 from the oncoming lane L2 of the road.

The pedestrian recognition unit 131 determines, for example, whether a pedestrian P is present around the host vehicle M (for example, a monitoring area in front of the host vehicle M). The pedestrian recognition unit 131 recognizes pedestrians P present in the monitoring area on the basis of information input from the camera 10, the radar device 12, and the finder 14 via the object recognition device 16. The pedestrian recognition unit 131 estimates positions, moving directions, and moving speeds of the recognized pedestrians P.

The pedestrian recognition unit 131 calculates, for example, the moving directions and moving speeds of the pedestrians P on the basis of changes in the positions of the pedestrians P recognized by the camera 10 or the radar device 12.

In FIG. 3, the pedestrian recognition unit 131 recognizes the pedestrians P (P1, P2, P3, P4, and P5). In addition, the pedestrian recognition unit 131 determines whether the recognized pedestrians P are crossing the road L.

The pedestrian recognition unit 131 determines, for example, whether a pedestrian P is a crossing pedestrian crossing the road L on the basis of the moving direction and moving speed of the pedestrian P with respect to the road L. The pedestrian recognition unit 131 determines that the pedestrian P is crossing when the moving direction of the pedestrian P is a transverse direction and the pedestrian is moving at a moving speed of a threshold value or greater. The transverse direction refers to a direction within a predetermined angle range centered at 90 degrees with respect to an extending direction of the road L (excluding directions away from a driveway on a sidewalk). However, when a distance or an arrival time between ends LR and LL of the road L that is a driveway is equal to or longer than a reference value, the pedestrian recognition unit 131 may determine that the pedestrian P is not a crossing pedestrian.

In FIG. 3, pedestrians P1, P2, and P5 are recognized as crossing pedestrians by the pedestrian recognition unit 131 with respect to the host vehicle M. A pedestrian P3 is not recognized as a crossing pedestrian because of moving in the extending direction of the road L. A pedestrian P4 is not recognized as a crossing pedestrian because of stopping on a sidewalk.

Furthermore, the pedestrian recognition unit 131 determines from which side of a lane of the road L the crossing pedestrians are crossing. In addition, the pedestrian recognition unit 131 determines whether the crossing pedestrians crossing from the oncoming lane L2 side, toward an evacuation area EA to be described below, are moving to the evacuation area EA.

In the example of FIG. 3, the pedestrian recognition unit 131 recognizes that a pedestrian P2 is moving to the evacuation area EA among P2 and P5 crossing from the oncoming lane L2 side on the basis of a position of the evacuation area EA, and the positions, moving directions, moving speeds, and the like of the pedestrians P.

Next, processing executed by the space recognition unit 132 will be described. The space recognition unit 132 recognizes the dividing strip R provided between the traveling lane L1 on which the host vehicle M travels and the oncoming lane L2 on the basis of a result of the recognition by the object recognition device 16. The dividing strip R is a road facility provided on the road L to obstruct entry of vehicles.

The dividing strip R may be provided with a space having a predetermined width or more that obstructs the entry of vehicles and does not obstruct walking of pedestrians. The predetermined width is, for example, a width or more that does not hinder traveling of vehicles at least when a pedestrian has stopped in a space having the predetermined width. In the following description, this space is referred to as the evacuation area EA.

The evacuation area EA is a space formed at a height less than a predetermined height from a road surface by blocks or curbs, a space surrounded by objects such as poles and trees which obstruct the entry of vehicles but through which pedestrians can slip, a space (zebra zone) surrounded by white lines indicating entry prohibition, or the like. The predetermined height is, for example, a height which is difficult for the pedestrians P to get over on foot (for example, a height from a knee to a waist of a person). However, road section lines such as white lines that merely separate lanes from one another are not included in the evacuation area.

In addition, the dividing strip R has a structure that obstructs entry of vehicles and also obstructs walking of the pedestrians P crossing the road L. For example, when guardrails and barriers having the predetermined height or higher are provided on the dividing strip R, in such a case, the crossing pedestrians can enter or leave the dividing strip R, but it is difficult for the crossing pedestrians to cross through the dividing strip R. Such spaces (structures) are not included in the evacuation area.

The crossing pedestrians can enter or leave such an evacuation area EA. That is, the crossing pedestrians can cross through the evacuation area EA.

More specifically, the space recognition unit 132 recognizes a "position," a "height," a "width," and the like of the structure on the basis of a result of the recognition by the object recognition device 16. Information on the position may be given a certain width. The space recognition unit 132 recognizes a structure having a width equal to or larger than the predetermined width as the structure. The space recognition unit 132 recognizes, for example, blocks, curbs, poles, trees, zebra zones, guardrails, barriers, or the like as the structure.

The space recognition unit 132 determines whether an evacuation area is provided in the dividing strip R on the basis of the result of the recognition. The space recognition unit 132 determines whether an evacuation area EA is provided in the dividing strip R on the basis of, for example, conditions such as whether the structure is continuous in the proceeding direction of the host vehicle M within a recognized range, whether the height of the structure is less than the predetermined height, whether the structure can be passed through, and the like.

The space recognition unit 132 determines that, for example, a space provided with blocks, curbs, zebra zones, and the like is an evacuation area EA because it has a width equal to or more than the predetermined width and has a height less than the predetermined height. The space recognition unit 132 determines that, for example, a space provided with poles, trees, or the like is an evacuation area because the evacuation area has a width equal to or more than the predetermined width and the pedestrians P can pass it through even if poles, trees, or the like has a height equal to or higher than the predetermined height. On the other hand, the space recognition unit 132 determines that, for example, a space provided with barriers or the like is not an evacuation area EA because it has a height higher than the predetermined height.

Next, processing executed by the environment recognition unit 133 will be described. The environment recognition unit 133 recognizes a state of the road L on which the host vehicle M travels. The state of the road L includes, for example, information determined based on information such as speeds of other vehicles m and states of signals, or a traffic environment of a the road on which the host vehicle M travels that includes a traffic volume of the road L acquired in any method, and the like.

When a traffic volume on the road is recognized, the environment recognition unit 133 sets, for example, a certain monitoring area on the oncoming lane L2 and counts the number of other vehicles m traveling in the area. The environment recognition unit 133 determines that the traffic volume is large when the counted number of other vehicles m exceeds a predetermined value per unit time.

Furthermore, the environment recognition unit 133 determines whether or not the state of the road L on which the host vehicle M travels is suitable for crossing of a crossing pedestrian on the basis of the speeds of other vehicles m, the states of signals, and the like in addition to a size of the determined traffic volume. For example, when the traffic volume of the traveling lane L1 on which the host vehicle M travels is large and the speeds of other vehicles m on the traveling lane L1 are high, the environment recognition unit 133 determines that the state of the road L on which the host vehicle M travels is not suitable for crossing. The environment recognition unit 133 makes such a determination because a crossing pedestrian crossing from the oncoming lane L2 side is more likely to temporarily stop in the evacuation area EA when the traffic volume of the traveling lane L1 is large. In addition, for example, when the traffic volume of the oncoming lane L2 is large and the speeds of other vehicles m on the oncoming lane L2 are high, the environment recognition unit 133 determines that the state of the road L on which the host vehicle M travels is not suitable for crossing. The environment recognition unit 133 makes such a determination because pedestrians are unlikely to cross when the traffic volume of the oncoming lane L2 is large. The environment recognition unit 133 outputs a result of determining whether or not the state of the road is suitable for crossing to the pedestrian avoidance determination unit 141 to be described below.

Moreover, alternatively, the environment recognition unit 133 may determine whether the traffic volume of the oncoming lane L2 on a lane on which the host vehicle M travels is less than a reference. When the number of other vehicles m is smaller than the reference, since the road is empty, it is inferred that a crossing pedestrian will cross from the oncoming lane L2 side but is more likely to temporarily stop in the evacuation area EA.

Figure 4:
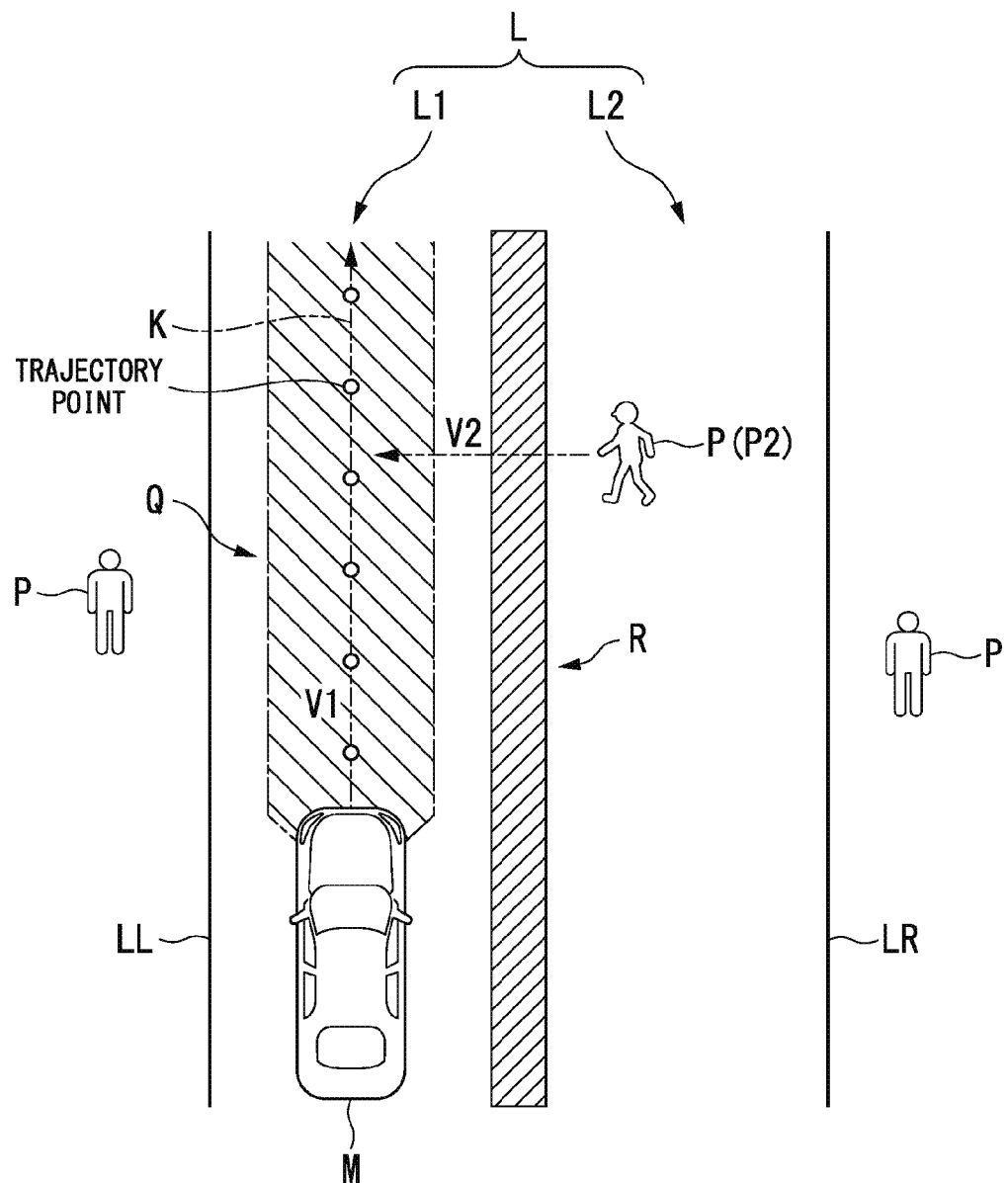
FIG. 4 is a diagram which shows a method of determining whether a crossing pedestrian interferes with a trajectory of the host vehicle M.

Next, an avoidance support of the host vehicle M executed by the pedestrian avoidance determination unit 141 will be described. FIG. 4 is a diagram which shows a method of determining whether a crossing pedestrian will interfere with a trajectory of the host vehicle M.

The pedestrian avoidance determination unit 141 acquires information on a current position and a speed V2 in a transverse direction of a crossing pedestrian (P2 in FIG. 4) recognized by the pedestrian recognition unit 131, and estimates a future position of the crossing pedestrian at a certain time point on the basis of the acquired information. The certain time point is a future time point at which the host vehicle M reaches the same position as the crossing pedestrian in a lane direction. When the position of the crossing pedestrian at the time point overlaps with a line of sight area Q having a width slightly larger than a width of the host vehicle M around a target trajectory K of the host vehicle M, it is determined that the crossing pedestrian will interfere with the trajectory of the host vehicle M.

In addition, the pedestrian avoidance determination unit 141 determines whether the crossing pedestrian is moving from the oncoming lane L2 side to the evacuation area EA on the basis of a result of the recognition by the pedestrian recognition unit 131 and the space recognition unit 132. The pedestrian avoidance determination unit 141 determines whether the crossing pedestrian is moving from the oncoming lane L2 side to the evacuation area EA on the basis of a result of the recognition of the crossing pedestrian by the pedestrian recognition unit 131 and a result of the recognition by the space recognition unit 132.

Next, processing executed by the avoidance control unit 142 will be described.

In principle, when the pedestrian avoidance determination unit 141 determines that the crossing pedestrian interferes with the trajectory of the host vehicle M, the avoidance control unit 142 controls the speed control unit 164 and/or the steering control unit 166, and executes a predetermined avoidance support for avoiding contact between the vehicle and the crossing pedestrian by controlling one or both of the steering and acceleration/deceleration of the vehicle.

The predetermined avoidance support is, for example, causing the host vehicle M to perform some or all of deceleration, slowing down, temporary stopping, and avoidance by steering by controlling the speed control unit 164 and/or the steering control unit 166. In addition, the predetermined avoidance support may include an alarm output by the HMI 30 when a crossing pedestrian is recognized. The alarm includes images, characters, sounds, and the like output by the HMI 30.

The avoidance control unit 142 estimates a time (Time to a collision: TTC) until the crossing pedestrian will come into contact with the host vehicle M on the basis of the speed V2 of the crossing pedestrian and a speed V1 of the host vehicle M, and determines a control amount of the avoidance support on the basis of a value of the TTC. For example, the avoidance control unit 142 causes the host vehicle M to perform an avoidance operation using sudden braking and steering when the TTC is small. In addition, the avoidance control unit 142 causes the host vehicle M to perform an avoidance operation using gentle braking when the TTC is large. The avoidance control unit 142 may acquire the value of the TTC from the pedestrian avoidance determination unit 141.

However, when the pedestrian avoidance determination unit 141 determines that the crossing pedestrian will interfere with the trajectory of the host vehicle M and determines that the crossing pedestrian is moving from the oncoming lane L2 side to the evacuation area EA, the avoidance control unit 142 controls the speed control unit 164 and/or the steering control unit 166, and curbs an avoidance support for avoiding contact with the crossing pedestrian.

"Curbing an avoidance support" means, for example, (1) decreasing brake torque or a steering amount, (2) decreasing a rate of an increase of the brake torque or the steering amount, (3) changing a threshold value for actuating an avoidance operation such that the operation is hard to be actuated, or (4) reducing an output of the alarm, as compared with a case of not curbing an avoidance support.

A reason for curbing an avoidance support is that it is determined that the crossing pedestrian stops in the evacuation area EA to check traffic conditions on the traveling lane L1 side when the crossing pedestrian is moving from the oncoming lane L2 side to the evacuation area EA, and that there is a high probability that the future position of the crossing pedestrian will not interfere with the target trajectory K when the crossing pedestrian stops in the evacuation area EA.

As a result of the processing described above, when the crossing pedestrian is moving from the oncoming lane L2 side to the evacuation area EA, the avoidance control unit 142 prevents a predetermined avoidance support from being performed excessively.

However, when the pedestrian recognition unit 131 recognizes that the crossing pedestrian continues to move in the evacuation area EA, the curbed avoidance support may be recovered and the avoidance control unit 142 may perform a predetermined avoidance support.

In addition, even when the dividing strip R is not traversable, it is determined that there is a high probability that the crossing pedestrian cannot move from the dividing strip R to the traveling lane L1 side, and it is determined that the avoidance support may be curbed. For this reason, when the pedestrian P is moving from the oncoming lane L2 side to the dividing strip R, the avoidance control unit 142 prevents the predetermined avoidance support from being performed excessively.

In addition, when the pedestrian avoidance determination unit 141 determines that the state of the road L is not suitable for crossing, the avoidance control unit 142 may curb the avoidance support by controlling the speed control unit 164 and/or the steering control unit 166.

[Processing Flow]

Figure 5:
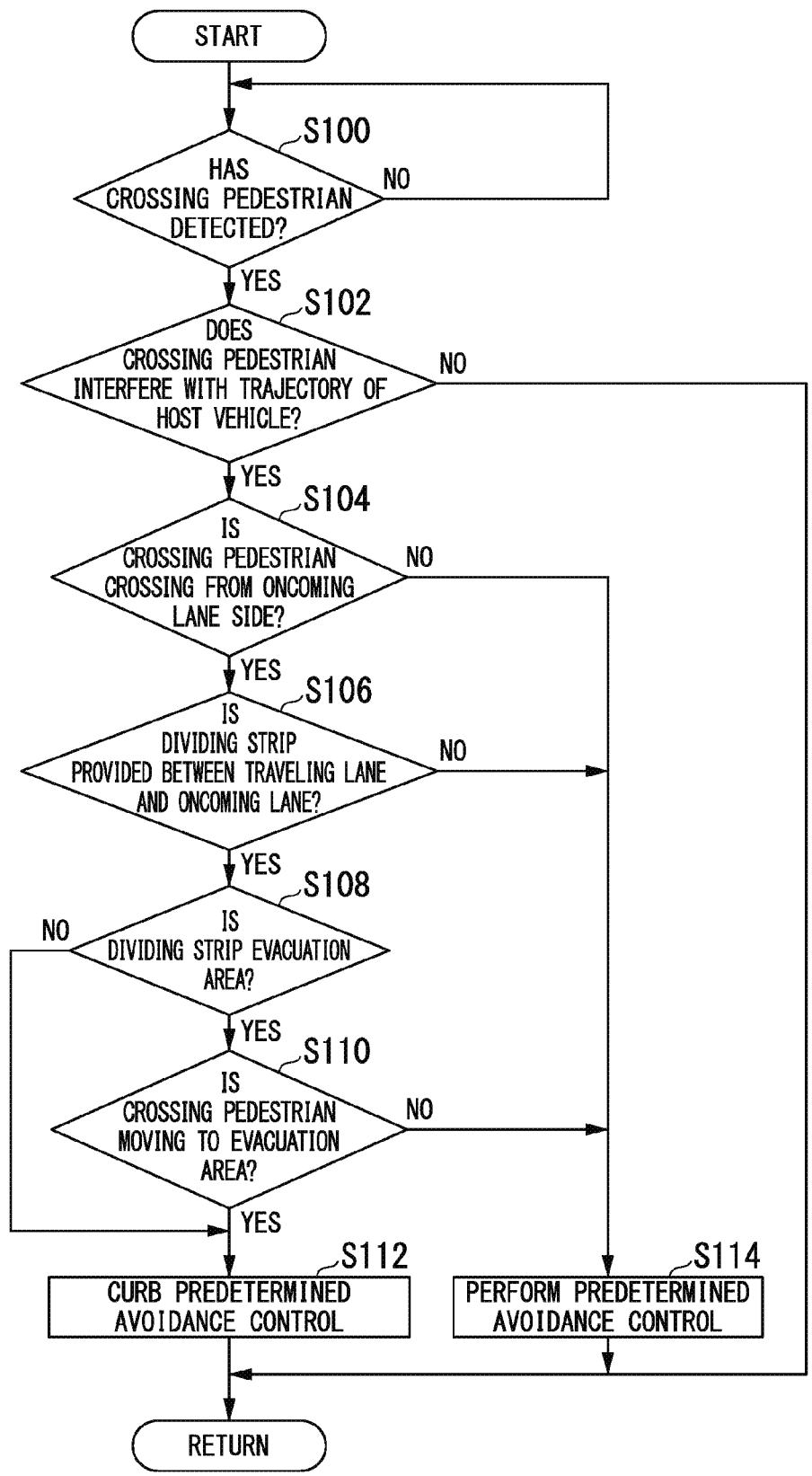
FIG. 5 is a diagram which shows an example of a state in which a pedestrian P intending to cross is present around the host vehicle M.

Next, a flow of processing executed by the automated driving control device 100 will be described. FIG. 5 is a flowchart which shows an example of the flow of the processing executed by the automated driving control device 100.

The pedestrian recognition unit 131 determines whether a crossing pedestrian has been detected (step S100). When the pedestrian recognition unit 131 determines that a crossing pedestrian has been detected, the pedestrian avoidance determination unit 141 determines whether the crossing pedestrian will interfere with the trajectory of the host vehicle M (step S102).

In the determination in step S102, a step of determining whether or not the state of the road L is suitable for the crossing and a step of determining whether the pedestrian P detected by the pedestrian recognition unit 131 is a crossing pedestrian crossing the road L may be included as a subroutine. In step S102, when the crossing pedestrian is not crossing the road L, it is determined that the crossing pedestrian will not interfere with the trajectory of the host vehicle M.

Figure 6:
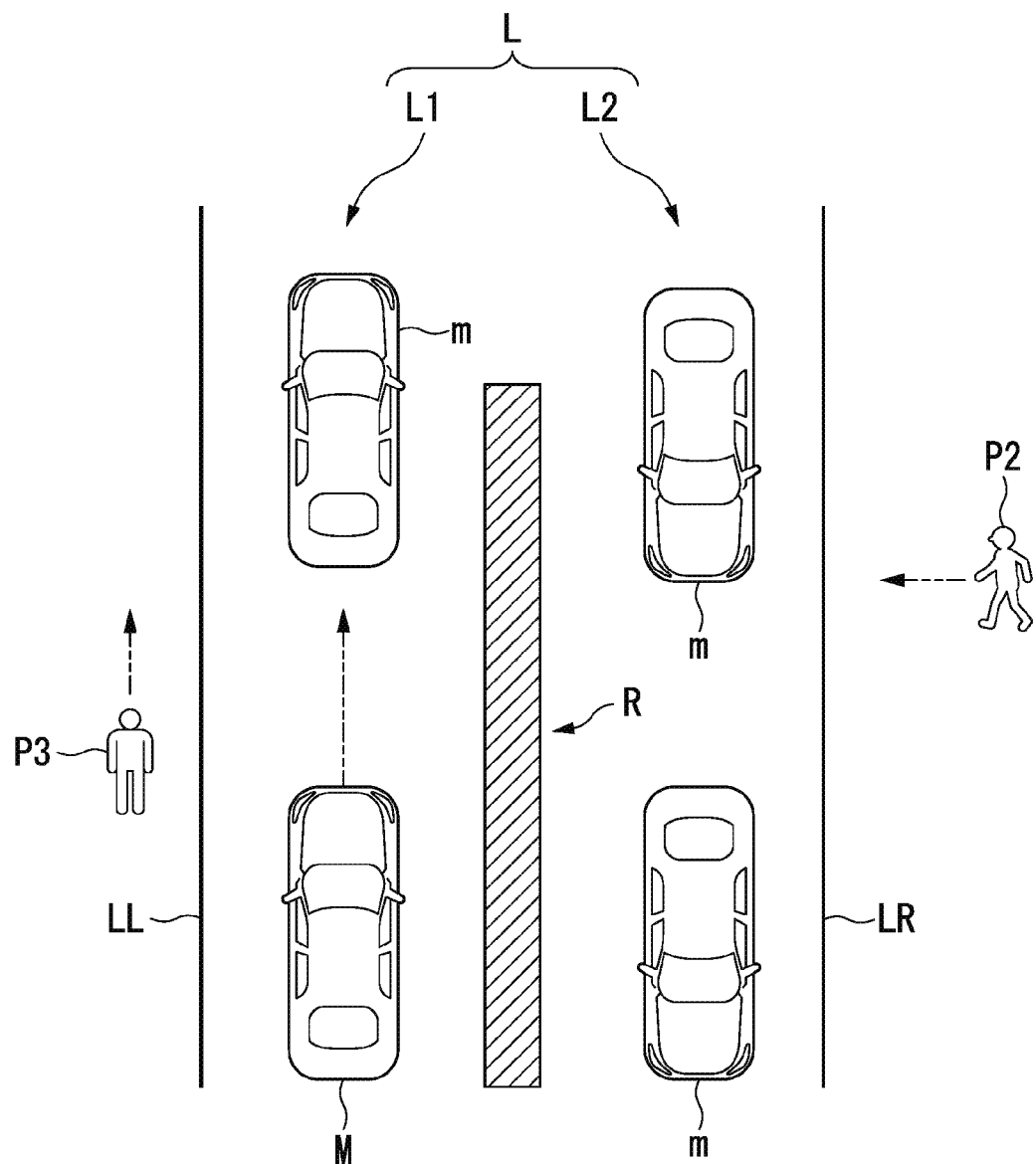
FIG. 6 is a flowchart which shows an example of a flow of processing executed in the automated driving control device 100.

FIG. 6 is a diagram which shows a state of determining whether the pedestrian P is crossing the road L. Another vehicle m is traveling on the oncoming lane L2 side and the avoidance control unit 142 determines that a state of the oncoming lane L2 side is not suitable for crossing. The pedestrian recognition unit 131 determines that a pedestrian P2 is not a crossing pedestrian even when the pedestrian P2 is moving in a direction of the road L and a negative determination is obtained in step S102 on the basis of the result of the determination by the avoidance control unit 142. In addition, it is determined that a pedestrian who is not moving to the road L side, such as a pedestrian P3, is not a crossing pedestrian, and a negative determination is obtained in step S102. When a negative determination is obtained in step S102, the avoidance support is not performed.

Returning to FIG. 5, when the pedestrian avoidance determination unit 141 determines that the crossing pedestrian interferes with the trajectory of the host vehicle M, the pedestrian recognition unit 131 determines whether a pedestrian P crossing the road L on which the host vehicle M travels is crossing from the oncoming lane L2 side (step S104).

When the pedestrian recognition unit 131 determines that the pedestrian P is a crossing pedestrian crossing from the oncoming lane L2 side, the space recognition unit 132 determines whether the dividing strip R is provided between the traveling lane L1 on which the host vehicle M travels and the oncoming lane L2 on the basis of a result of the recognition by the object recognition device 16 (step S106).

When the space recognition unit 132 determines that there is the dividing strip R, the pedestrian avoidance determination unit 141 determines whether the dividing strip R is the evacuation area EA on the basis of a result of the recognition by the space recognition unit 132 (step S108).

When it is determined that the dividing strip R is the evacuation area EA, the pedestrian avoidance determination unit 141 determines whether the crossing pedestrian is moving from the oncoming lane L2 side to the evacuation area EA on the basis of results of the recognition by the pedestrian recognition unit 131 and the space recognition unit 132 (step S110).

When it is determined that the crossing pedestrian is moving from the oncoming lane L2 side to the dividing strip R, the avoidance control unit 142 curbs a predetermined avoidance support (step S112). In addition, even when a negative determination is obtained in step S108, the avoidance control unit 142 curbs the predetermined avoidance support (step S112). When a negative determination is obtained in step S104 or step S106, the avoidance control unit 142 performs the predetermined avoidance support (step S114).

Note that, the processing of curbing, by the avoidance control unit 142, an avoidance support when the environment recognition unit 133 determines that the state of the road L is not suitable for crossing of the pedestrian P is described as internal processing in step S102, but an additional step may be added thereto in the flowchart described above. In addition, when the environment recognition unit 133 determines that the state of the road L is not suitable for the crossing of the pedestrian, the pedestrian avoidance determination unit 141 may adjust (in the same meaning as curbing the avoidance support) the avoidance support such that the avoidance support is hard to be actuated by, for example, largely changing the value of TTC or changing the determination that the pedestrian P is crossing.

According to the embodiment described above, the vehicle system 1 can prevent control such as temporary stopping or deceleration from being used excessively and facilitate traveling using automated driving when the pedestrian P crossing the road L is recognized during automated driving.

Figure 7:
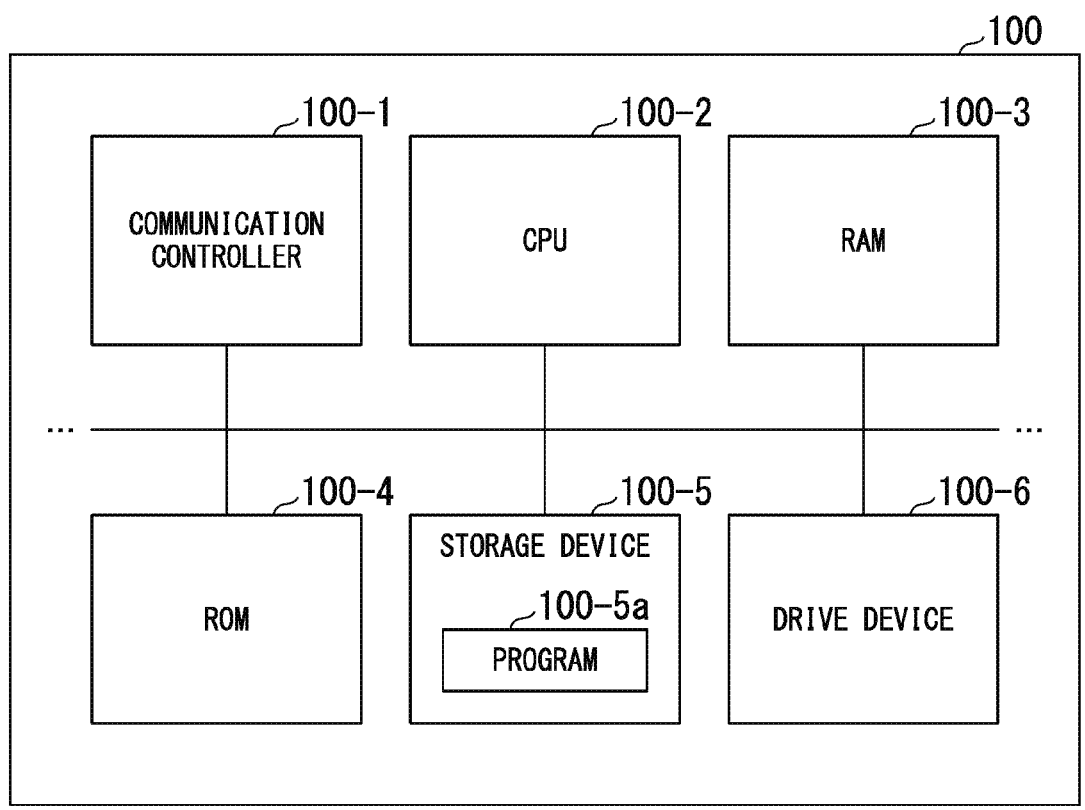
FIG. 7 is a diagram which shows a plurality of constituents which can be used in the automated driving control device 100.

In the following description, hardware aspects of the embodiment will be described. FIG. 7 is a diagram which shows a plurality of constituents which can be used in the automated driving control device 100. The automated driving control device 100 is configured to include a communication controller 100-1, a CPU 100-2, a RAM 100-3 used as a working memory, a ROM 100-4 storing a booting program and the like, a storage device 100-5 such as a flash memory or an HDD, a drive device 100-6, and the like being connected to each other by an internal bus or a dedicated communication line.

The communication controller 100-1 communicates with components other than the automated driving control device 100 shown in FIG. 1. The storage device 100-5 stores a program 100-5a executed by the CPU 100-2. This program is expanded in the RAM 100-3 by a direct memory access (DMA) controller (not shown) or the like and executed by the CPU 100-2. As a result, some or all of the recognition unit 130, the action plan generation unit 140, the acquisition unit 162, the speed control unit 164, and the steering control unit 166 are realized.

The embodiment described above can be expressed as follows.

A vehicle control apparatus includes a storage device and a hardware processor configured to execute a program stored in the storage device, in which the hardware processor executes the program, thereby recognizing a crossing pedestrian crossing a road on which a vehicle travels, recognizing whether there is a space having a predetermined width or more between a lane on which the vehicle travels and an oncoming lane, executing an avoidance support for avoiding contact between the vehicle and the recognized crossing pedestrian on the basis of a behavior of the crossing pedestrian and a behavior of the vehicle, determining whether the recognized crossing pedestrian is moving from the oncoming lane side to a space recognized by the space recognition unit, and curbing the avoidance when it is determined that the crossing pedestrian is moving to the space.

A mode for implementing the present invention has been described using the embodiment. However, the present invention is not limited to such an embodiment, and various modifications and substitutions may be made within a range not departing from the gist of the present invention. For example, one lane being on each side has been described in the embodiment described above, but the present invention can be applied to a road having two or more lanes on each side. In this case, the automated driving control device 100 may determine that pedestrians are less likely to cross at one time as the number of lanes is large, and curb the support.

DESCRIPTION OF THE REFERENCE SYMBOLS

1 Vehicle system
10 Camera
12 Radar device
14 Finder
16 Object recognition device
20 Communication device
30 HMI
40 Vehicle sensor
50 Navigation device
51 GNSS receiver
51 Receiver
52 Navigation HMI
53 Route determination unit
54 First map information 61 Recommended lane determination unit
62 Second map information
80 Driving operator
100 Automated driving control device
100-1 communication controller
100-2 CPU
100-3 RAM
100-4 ROM
100-5 Storage device
100-5a Program
100-6 Drive device
120 First control unit
130 Recognition unit
131 Pedestrian recognition unit
132 Space recognition unit
140 Action plan generation unit
141 Pedestrian avoidance determination unit
142 Avoidance control unit
160 Second control unit
162 Acquisition unit
164 Speed control unit
166 Steering control unit
200 Traveling drive force output device
210 Brake device
220 Steering device
K Target trajectory
m Other vehicles
M Host vehicle

The invention claimed is:

1. A vehicle control apparatus comprising:
a pedestrian recognizer configured to recognize a crossing pedestrian crossing a road on which a vehicle travels;
a space recognizer configured to recognize whether there is a space having a predetermined width or more between a lane on which the vehicle travels and an oncoming lane; and
a driving controller configured to execute avoidance support for avoiding contact between the vehicle and the crossing pedestrian recognized by the pedestrian recognizer based on a behavior of the crossing pedestrian and a behavior of the vehicle,
wherein the driving controller is configured to determine whether the crossing pedestrian recognized by the pedestrian recognizer is moving from the oncoming lane side to a space recognized by the space recognizer, and curb the avoidance support upon determination that the crossing pedestrian is moving to the space, and
wherein the driving controller is configured to determine whether a number of other vehicles traveling on an oncoming lane with respect to a lane on which the vehicle travels is less than a predetermined number, and curb the avoidance support upon determination that the number of other vehicles is less than the predetermined number.

2. The vehicle control apparatus according to claim 1, wherein the driving controller is configured to determine whether or not a traveling lane on which the vehicle travels is suitable for crossing, and curb the avoidance support upon determination that the traveling lane is not suitable for crossing.

3. A vehicle control apparatus, comprising:
a pedestrian recognizer configured to recognize a crossing pedestrian crossing a road on which a vehicle travels;
a space recognizer configured to recognize whether there is a space having a predetermined width or more between a lane on which the vehicle travels and an oncoming lane; and
a driving controller configured to execute avoidance support for avoiding contact between the vehicle and the crossing pedestrian recognized by the pedestrian recognizer based on a behavior of the crossing pedestrian and a behavior of the vehicle,
wherein the driving controller is configured to determine whether the crossing pedestrian recognized by the pedestrian recognizer is moving from the oncoming lane side to a space recognized by the space recognizer, and curb the avoidance support upon determination that the crossing pedestrian is moving to the space, and
wherein the driving controller is configured to determine whether a traffic volume of the oncoming lane of the lane on which the vehicle travels is less than a reference, and curb the avoidance support upon determination that the traffic volume is less than the reference.

4. The vehicle control apparatus according to claim 1, wherein, even if a future position predicted based on a speed of the crossing pedestrian in a road width direction interferes with a trajectory of the vehicle, the driving controller is configured to determine whether the crossing pedestrian is moving to a space recognized by the space recognizer, and curb the avoidance support upon determination that the crossing pedestrian is moving to the space.

5. The vehicle control apparatus according to claim 1, wherein the space recognizer is configured to recognize a space having the predetermined width or more in which a structure that obstructs entry of the vehicle and does not obstruct walking of the crossing pedestrian is present.

6. A vehicle control method comprising:
recognizing, by a pedestrian recognizer, a crossing pedestrian crossing a road on which a vehicle travels;
recognizing, by a space recognizer, whether there is a space having a predetermined width or more between a lane on which the vehicle travels and an oncoming lane;
avoiding, by a driving controller, contact between the vehicle and a crossing pedestrian recognized by the pedestrian recognizer based on a behavior of the crossing pedestrian and a behavior of the vehicle, determining whether the crossing pedestrian recognized by the pedestrian recognizer is moving from the oncoming lane side to a space recognized by the space recognizer, and curbing the avoidance upon determination that the crossing pedestrian is moving to the space; and
determining, by the driving controller, whether a number of other vehicles traveling on an oncoming lane with respect to a lane on which the vehicle travels is less than a predetermined number, and curbing the avoidance support upon determination that the number of other vehicles is less than the predetermined number.

7. A program which is configured to cause a computer, mounted on a vehicle including a pedestrian recognizer for recognizing a crossing pedestrian crossing a road on which the vehicle travels, to
recognize whether there is a space having a predetermined width or more between a lane on which the vehicle travels and an oncoming lane;
execute avoidance support for avoiding contact between the vehicle and the recognized crossing pedestrian based on a behavior of the crossing pedestrian and a behavior of the vehicle;
determine whether the recognized crossing pedestrian is moving from the oncoming lane side to the recognized space, and curb the avoidance support upon determination that the crossing pedestrian is moving to the space; and determine whether a number of other vehicles traveling on an oncoming lane with respect to a lane on which the vehicle travels is less than a predetermined number, and curb the avoidance support upon determination that the number of other vehicles is less than the predetermined number.

\* \* \* \* \*